United States Patent [19]

Kloss et al.

[11] Patent Number: 5,328,879
[45] Date of Patent: Jul. 12, 1994

[54] BINDING AND PLASTICIZING AGENT FOR PREPARING CARBON-CONTAINING, REFRACTORY, CERAMIC MATERIALS AND MATERIAL PREPARED THEREWITH

[75] Inventors: Gunnar Kloss, Mülheim-Kärlich; Christian Weidemüller, Neuwied, both of Fed. Rep. of Germany

[73] Assignee: Veitscher-Magnesitwerke-Actien-Gesellschaft, Austria

[21] Appl. No.: 27,043

[22] Filed: Mar. 8, 1993

[30] Foreign Application Priority Data

Mar. 8, 1992 [DE] Fed. Rep. of Germany ....... 4207248

[51] Int. Cl.$^5$ .............................................. C04B 35/52
[52] U.S. Cl. .................... 501/100; 106/38.28; 106/38.35; 524/495; 524/594; 527/303
[58] Field of Search .................. 501/99, 100, 101, 104, 501/105, 116; 524/495, 594; 527/303; 106/38.25, 38.28, 38.35

[56] References Cited

U.S. PATENT DOCUMENTS 4,066,467  1/1978  Rechter ............................ 501/100
5,240,498  8/1993  Matalon ............................ 501/99

FOREIGN PATENT DOCUMENTS 0100306  2/1984  European Pat. Off. ............ 501/100

Primary Examiner—Karl Group
Assistant Examiner—Paul Marcantoni
Attorney, Agent, or Firm—John F. A. Earley; John F. A. Earley, III

[57] ABSTRACT

The present invention pertains to a binding and plasticizing agent for preparing refractory materials, in which the binding agent contains a synthetic resin, a phosphate, and a surface-active agent.

13 Claims, No Drawings

BINDING AND PLASTICIZING AGENT FOR PREPARING CARBON-CONTAINING, REFRACTORY, CERAMIC MATERIALS AND MATERIAL PREPARED THEREWITH

The present invention pertains to a binding and plasticizing agent for preparing carbon-containing, refractory, ceramic materials, which are further processed into monolithic masses or molded articles, as well as to a carbon-containing, refractory, ceramic material using this binding agent.

The binding of refractory materials in the case of monolithic masses and molded articles with coal products, such as tar or pitch, has been known for a long time. It is used primarily to increase the resistance to infiltration or the resistance to aggressive (metallurgical) slags of the corresponding refractory ceramic products.

Pitch-bound refractory products have high mechanical strength, even after coking of the binding gent, which takes place at high temperatures, e.g., after insertion of the products in a metallurgical melting vessel. In addition, the coke residues resulting from such a pitch, which are formed during the use of the product, are relatively resistant to oxidation.

Thus, some of the pitch- or tar-bound products possess better properties than do refractory materials in which synthetic resins are used as the binding agent.

The advantage of the synthetic resins is that they do not contain any polycyclic aromatic hydrocarbons, so that they are preferred for reasons of environmental protection.

However, the poorer wear behavior of such carbon-containing, refractory materials, which contain exclusively synthetic resins as binding agents, is disadvantageous. Another disadvantage of synthetic resins is their high price.

The aforementioned disadvantages of synthetic resin binding can partially be compensated by adding metals to the carbon-containing, refractory mixture (Stahl und Eisen, 108 (1988), No. 22, 1049).

However, such metal additives are expensive. In addition, metal carbides, some of which are unstable, are formed; they may be formed during use from the metal powder additives, and therefore they limit the recyclability of the carbon-containing, refractory material. However, precisely the reuse of refractory materials is an important environmental policy task.

Therefore, the task of the present invention is to provide a binding and plasticizing agent for carbon-containing, refractory ceramic materials, which ensures increased mechanical strength of the material compared with pure synthetic resins, especially during use, i.e., after coking, as well as improved resistance to oxidation of the products prepared.

It was now surprisingly found that the combination of a liquid, curable synthetic resin with a liquid, inorganic phosphate carrier meets the aforementioned requirements in the presence of a liquid, anionic and/or nonionic surface-active agent or an organic base, and contributes to a markedly improved mechanical strength of the products in the coked state and to improved resistance to oxidation.

While the mechanical strength of exclusively resin-bound materials during use, i.e., after coking of the resin, can be attributed only to the pyrolytic carbon formed from the binding resin, additional crosslinking, by which the strength of the material is markedly improved, is achieved due to the additional presence of an inorganic phosphate carrier.

At the same time, the phosphate component permits more effective protection against oxidation of the carbon contained in the material, which may occur in the form of, e.g., finely dispersed graphite, coke, or carbon black, because the attack of oxidizing media is hindered by the blocking of active surfaces and the simultaneous vitrifying effect of the phosphate.

In its most general embodiment, the present invention pertains to a binding and plasticizing agent for preparing carbon-containing, refractory, ceramic, materials from a mixture of: −0.1 to 90 parts by weight of a liquid, curable synthetic resin, 0.1 to 70 parts by weight of a liquid inorganic phosphate carrier, and 0.1 to 50 parts by weight of a liquid anionic and/or nonionic surface-active agent and/or an organic base.

The following concentrations are preferred within these relatively broad ranges of the amounts of the individual components:

30 to 70 parts by weight synthetic resin, 10 to 50 parts by weight phosphate carrier, and 5 to 30 parts by weight surface-active agent and/or base, wherein the sum of the individual components shall always be 100 parts by weight.

The percentage of the anionic and/or nonionic surface-active agents in the binding agent combination contributes to a deceleration of the curing reaction of the synthetic resin. This is advantageous because, e.g., phenol formaldehyde resins cure more or less rapidly in the presence of acid components, which hinders the processability of the refractory material, e.g., during the application of monolithic masses, or during the preparation of molded articles. The effect of the surface-active agent additive is to optimize the processability of the material here.

This purpose is also served by the alternative or cumulative addition of an organic base, preferably in an amount of 3 to 10 parts by weight relative to the total binding agent.

The liquid synthetic resin may consist of a phenolic or novolak resin, e.g., a phenol formaldehyde resin.

Phosphoric acid or monoaluminum phosphate as a representative of the acid phosphates may equally be used as the phosphate carrier within the binding agent.

The said surface-active agents, i.e., surface-active substances, should consist of ethylene oxide adducts according to one embodiment of the present invention. A 25% solution of an adduct of ethylene oxide to a coconut fatty alcohol with a C chain length of C 12 to C 18 may be mentioned as a representative of this class; this product forms only little foam. Glycols (polyhydric alcohols) are suitable as well.

Even for cost reasons, the percentage of synthetic resin should advantageously be kept as low as possible. On the other hand, the synthetic resin assumes an important function within the binding agent mixture, because, e.g., an increased percentage of phosphate impairs the hot strength properties of the carbon-containing, refractory materials thus prepared, because gas-producing reactions are associated with it during use. Moreover, an excessive reduction of the synthetic resin would lead to a reduction of the pyrolytic carbon in the texture and in the pores of the refractory material, and consequently to an impairment of the resistance to the infiltration of metal and slag.

One particular advantage of the said binding agent is that it can also be used for processing recirculated refractory materials. Recycled refractory materials have been known to often have high porosity, and consequently to require a large amount of binding agent. In contrast, substantial cost advantages can be achieved with the binding agent being described here by minimizing the percentage of synthetic resin within the binding agent (while increasing the percentages of the phosphate and surface-active agent at the same time).

Based on the balance of the individual components of the mixture, it is possible to omit the addition of powdered synthetic resins, which has hitherto been considered to be indispensable, in order to process the material into a processable state.

Finally, it is possible to completely or at least partially omit oxidation-inhibiting metal powder additives due to the use of the binding agent being described here, because this function is now assumed by the phosphate component.

The binding agent being described may be used for preparing both basic and nonbasic masses and molded articles.

The binding agent component within the refractory ceramic mass is preferably between 2 and 10 wt. %.

Further characteristics of the present invention will become apparent from the characteristics of the subclaims as well as the other application documents.

The present invention will be explained in greater detail below on the basis of various exemplary embodiments.

EXAMPLE 1

The starting material being a C-containing, refractory, ceramic material consisting of:
  80 parts by weight bauxite,
  10 parts by weight silicon carbide (SIC), and
  10 parts by weight graphite
of the usual particle size fraction.

This starting refractory mixture was then mixed with 4 wt. % of one of two different binding agents, namely,
  A: a liquid phenol formaldehyde resin
  B: a mixture of:
    55 parts by weight of a liquid phenol formaldehyde resin,
    35 parts by weight liquid monoaluminum phosphate, and
    10 parts by weight of a mixture of an anionic surface-active agent and a nonionic surface-active agent.

The mixture was mixed homogeneously, and pressed into molded articles. The following properties were finally determined on cured test specimens that were fired at 1,000° C. after curing:

|  | Material with binding agent A | Material with binding agent B |
| --- | --- | --- |
| Cold compression strength (MPa) | 47.6 | 66.5 |
| Hot bending strength (at 1,400° C., under oxidizing atmosphere) (MPa) | 7.3 | 9.4 |
| Loss on oxidation |  |  |
| 1,300° C./3 hours (wt. %) | 4.5 | 2.9 |
| 1,300° C./6 hours (wt. %) | 10.8 | 7.7 |

EXAMPLE 2

In this case, a refractory material consisting of
  80 parts by weight recycled bauxite material,
  10 parts by weight silicon carbide, and
  10 parts by weight graphite
of the usual particle size fraction was mixed with 6 parts by weight of a binding agent mixture according to the present invention, consisting of
  45 parts by weight liquid formaldehyde resin,
  30 parts by weight liquid monoaluminum phosphate, and
  25 parts by weight of a mixture of anionic and nonionic surface-active agents
until homogeneity was reached, and subsequently pressed into molded articles. The following properties were determined on the molded articles: After curing:
  apparent density (g/cm$^3$) 2.78
  open porosity (vol.%) 7.3
  cold compression strength (MPa) 61.9
  hot bending strength (MPa) (1,400° C., oxidizing) 8.4
After coking at 1,000° C.:
  apparent density (g/cm$^3$) 2.75
  open porosity (vol.%) 13.8
  cold compression strength (MPa) 54.5

The above examples (including the reference example) prove the superiority of the material characteristics of the test specimens prepared with the binding and plasticizing agent according to the present invention.

We claim:

1. Binding and plasticizing agent for preparing carbon-containing, refractory materials from a mixture of:
   (a) 0.1 to 90 parts by weight of a liquid, curable synthetic resin,
   (b) 0.1 to 70 parts by weight of a liquid inorganic phosphate material, and
   (c) 0.1 to 30 parts by weight of a composition selected from the group consisting of a liquid anionic surface-active agent, a liquid nonionic surface-active agent, an organic base, and combinations thereof, wherein the sum of the components through (c) shall always be 100.

2. Agent in accordance with claim 1, comprising a mixture of
   (a) 30 to 70 parts by weight of a liquid, curable synthetic resin,
   (b) 10 to 50 parts by weight of a liquid inorganic phosphate material, and
   (c) 5 to 30 parts by weight of a composition selected from the group consisting of a liquid anionic surface-active agent, a liquid nonionic surface-active agent, an organic base, or combination thereof.

3. Agent in accordance with claim 2, in which the amount of the organic base is 3 to 10 parts by weight.

4. Agent in accordance with claim 1, in which the composition (c) consists of the combination of an amount of surface-active agent which is greater than 0 weight % of composition (c) and less than 100 weight % of composition (c) and an amount of base which is less than 100 weight % of composition (c) and greater than 0 weight % of compostion (c).

5. Agent in accordance with claim 1, in which the synthetic resin selected from the group consisting of a phenolic resin, a novolak resin, or a combination thereof.

6. Agent in accordance with claim 1, in which the liquid phosphate material consists of phosphoric acid or an acid phosphate, such as monoaluminum phosphate.

7. Agent in accordance with claim 1, in which the liquid surface-active agent consists of ethylene oxide adducts or glycols.

8. Agent in accordance with claim 1, in which the organic base is an aminoethanol.

9. A combination of carbon-containing, refractory ceramic material and the binding and plasticizing agent in accordance with claim 1, in which the refractory matrix material comprises one or more refractory oxides, and the carbon-containing component is selected from the group consisting of finely dispersed graphite, carbon black, coke, and a combination thereof, the binding and plasticizing agent being 2 to 10 wt. % of the combination.

10. Material in accordance with claim 9, in which the refractory oxides are selected from the group consisting of magnesia (MgO), bauxite, corundum, andalusite, and combinations thereof.

11. Binding and plasticizing agent for preparing carbon-containing, refractory materials from a mixture of:
   30 to 70 parts by weight of a liquid, curable synthetic resin,
   10 to 50 parts by weight of a liquid inorganic phosphate material, and
   5 to 30 parts by weight of a composition selected from the group consisting of a liquid anionic surface active agent, a liquid nonionic surface-active agent, an organic base, and a combination thereof, wherein the sum of the parts of the mixture is 100,
   in which the liquid synthetic resin consists of a phenolic resin, a novolak resin, or a combination thereof,
   in which the liquid phosphate material consists of monoaluminum phosphate,
   in which the liquid surface-active agent consists of ethylene oxide adducts or glycols, and
   in which the organic base consists of an aminoethanol.

12. A combination of a carbon-containing, refractory ceramic material and the binding and plasticizing agent in accordance with claim 11, in which the refractory matrix material comprises one or more refractory oxides, and the carbon-containing component comprises is selected from the group consisting of finely dispersed graphite, carbon black, coke, and combinations thereof, and
   in which the refractory oxides are selected from the group consisting of magnesia (MgO), bauxite, corundum, andalusite, and combinations thereof,
   the binding and plasticizing agent being 2 to 10 wt. % of the combination.

13. A combination of carbon-containing refractory ceramic material and the binding and plasticizing agent in accordance with claim 1, in which the refractory ceramic material includes one or more refractory oxides and a carbon-containing component, the carbon-containing component comprising finely dispersed graphite, carbon black, coke, or a combination thereof.

* * * * *